United States Patent
Shibata et al.

(10) Patent No.: US 10,315,547 B2
(45) Date of Patent: Jun. 11, 2019

(54) VEHICLE SEAT DEVICE AND INTAKE AND EXHAUST VALVE DEVICE

(71) Applicant: AISIN SEIKI KABUSHIKI KAISHA, Kariya-shi (JP)

(72) Inventors: Akiyoshi Shibata, Nagoya (JP); Yuki Fujii, Obu (JP); Hiroyuki Oda, Hamamatsu (JP); Shunsuke Hayakawa, Obu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/626,703

(22) Filed: Jun. 19, 2017

(65) Prior Publication Data
US 2017/0368968 A1 Dec. 28, 2017

(30) Foreign Application Priority Data
Jun. 23, 2016 (JP) .................... 2016-124973

(51) Int. Cl.
*B60N 2/90* (2018.01)
*B60N 2/66* (2006.01)

(52) U.S. Cl.
CPC ............. *B60N 2/914* (2018.02); *B60N 2/665* (2015.04)

(58) Field of Classification Search
CPC .................... B60N 2/914; B60N 2/66
See application file for complete search history.

(56) References Cited

U.S. PATENT DOCUMENTS

| 5,263,765 | A  | * | 11/1993 | Nagashima | A47C 7/467 297/284.6 |
|---|---|---|---|---|---|
| 5,320,409 | A  | * | 6/1994  | Katoh     | B60N 2/0232 297/284.6 |
| 6,088,643 | A  | * | 7/2000  | Long      | A47C 4/54 701/49 |
| 6,203,105 | B1 | * | 3/2001  | Rhodes, Jr. | A47C 4/54 297/284.6 |
| 8,616,654 | B2 | * | 12/2013 | Zenk      | B60N 2/914 297/452.41 |
| 2003/0038517 | A1 | * | 2/2003 | Moran    | B60N 2/914 297/284.3 |
| 2010/0289302 | A1 | * | 11/2010 | Cheng    | B60N 2/002 297/180.12 |

FOREIGN PATENT DOCUMENTS

JP 2010-233898 10/2010

OTHER PUBLICATIONS

U.S. Appl. No. 15/467,232, filed Mar. 23, 2017, Shibata et al.
U.S. Appl. No. 15/626,740, filed Jun. 19, 2017, Shibata et al.

* cited by examiner

*Primary Examiner* — Philip F Gabler
(74) *Attorney, Agent, or Firm* — Oblon, McClelland, Maier & Neustadt, L.L.P.

(57) ABSTRACT

A vehicle seat device includes: a plurality of air bags configured to be provided inside a seat; a flow path having a shared section to communicate with each of the air bags; a plurality of intake valves each of which is arranged at a flow path position at an upstream of each of the air bags when air is pumped into each of the air bags; a plurality of exhaust valves arranged at flow path positions communicating with the shared section; and a control device configured to control operations of the intake valves and the exhaust valves, in which the control device adjusts a discharge speed of internal air by selectively opening the exhaust valves when the internal air of each of the air bags is discharged.

5 Claims, 8 Drawing Sheets

|  | INTERNAL CAPACITY OF AIR BAG | NUMBER OF EXHAUST VALVES TO BE OPENED |
|---|---|---|
| CUSHION PELVIS | SMALL(A1) | 1 |
| CUSHION SIDE | SMALL(A1) | 1 |
| BACK PELVIS | SMALL(A1) | 1 |
| SHOULDER | LARGE(A2) | 2 |
| BACKSIDE | LARGE(A2) | 2 |

*FIG.10*
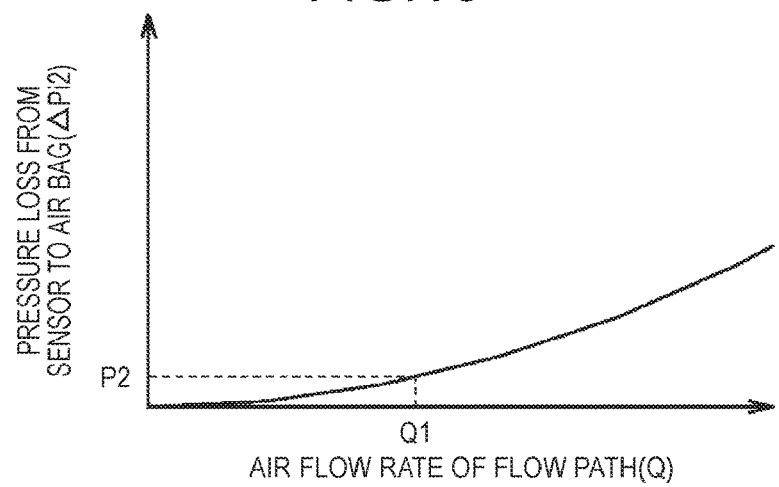
*FIG.11*
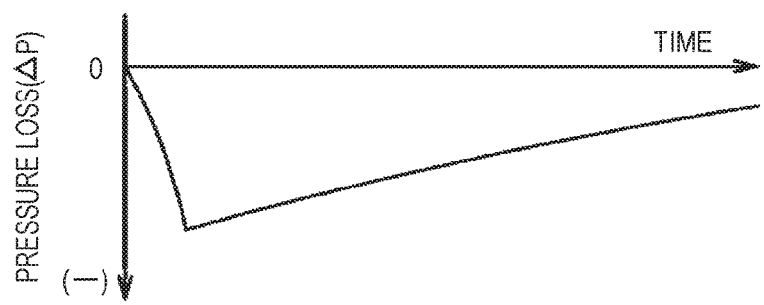
*FIG.12*
| | t = 0 | 0 < t ≤ t1 | t1 < t |
|---|---|---|---|
| α3 | 0 | t/t1 | 1 |
| β2 | | | |

VEHICLE SEAT DEVICE AND INTAKE AND EXHAUST VALVE DEVICE

CROSS REFERENCE TO RELATED APPLICATIONS

This application is based on and claims priority under 35 U.S.C. § 119 to Japanese Patent Application 2016-124973, filed on Jun. 23, 2016, the entire contents of which are incorporated herein by reference.

TECHNICAL FIELD

This disclosure relates to a vehicle seat device and an intake and exhaust valve device.

BACKGROUND DISCUSSION

In the related art, there has been a vehicle seat device in which air bags (bladders) configured to be provided inside a seat are expanded and contracted, so that the support shape of the seat can be changed. For example, a seat device disclosed in JP 2010-233898 A (Reference 1) includes a plurality of air bags configured to be provided inside a seat, a flow path having a shared section and communicating with each of the air bags, and an air pump that pumps air to each of the air bags via the flow path. The seat device further includes a plurality of intake valves each of which is provided at a flow path position at an upstream of one of the air bags when air is pumped into each of the air bags, and an exhaust valve (an integrated exhaust valve) provided at a flow path position communicating with the shared section. In addition, each of the air bags is expanded and contracted by controlling operations of the air pump, each of the intake valves, and the exhaust valve.

That is, when each air bag is filled with air, the air pump is driven in a state where the intake valve provided at the upstream of the target air bag is opened, and the exhaust valve is closed. When air is discharged from the air bag, the intake valve corresponding to the target air bag is opened and the exhaust valve provided at the flow path position communicating with the shared section is opened in a state where the air pump is stopped. As described above, when the internal air of each air bag is discharged to the outside, one exhaust valve is used in common, thereby achieving the simplification of the structure.

However, in many cases, the sizes (internal capacities) of air bags provided inside a vehicle seat are set depending on seat positions where the air bags are arranged. Thus, in the above described configuration of the conventional technology, in which one exhaust valve is shared, there is a problem in that when a seat support shape is changed by discharging internal air filled in each of air bags, a difference is likely to occur in the operation speed. Then, there is a possibility that an occupant seated on the seat may feel uncomfortable, and in this respect, there is still room for improvement.

Thus, a need exists for a vehicle seat device and an intake and exhaust valve device which are not susceptible to the drawback mentioned above.

SUMMARY

It is preferable that a vehicle seat device according to an aspect of the disclosure includes: a plurality of air bags provided inside a seat; a flow path having a shared section and communicating with each of the air bags; a plurality of intake valves each of which is arranged at a flow path position at an upstream of each of the air bags when air is pumped into each of the air bags; a plurality of exhaust valves arranged at flow path positions communicating with the shared section; and a control device configured to control operations of the intake valves and the exhaust valves, in which the control device adjusts a discharge speed of internal air by selectively opening the exhaust valves when the internal air of each of the air bags is discharged.

BRIEF DESCRIPTION OF THE DRAWINGS

The foregoing and additional features and characteristics of this disclosure will become more apparent from the following detailed description considered with the reference to the accompanying drawings, wherein:

FIG. 10 is a graph illustrating a relationship between an air flow rate of a flow path and a pressure loss from the pressure sensor to the air bag (when air is pumped);

FIG. 11 is a graph illustrating a change in a pressure loss according the passage of time from initiation of driving of an air pump (when air is pumped);

FIG. 12 is an explanatory view illustrating a relationship between a value of a correction coefficient corresponding to a change in an air flow rate and an elapsed time;

DETAILED DESCRIPTION

Hereinafter, descriptions will be made on a seat device having a pneumatic seat support function and an intake and exhaust valve device constituting the seat device according to a first embodiment with reference to drawings.

Figure 1:
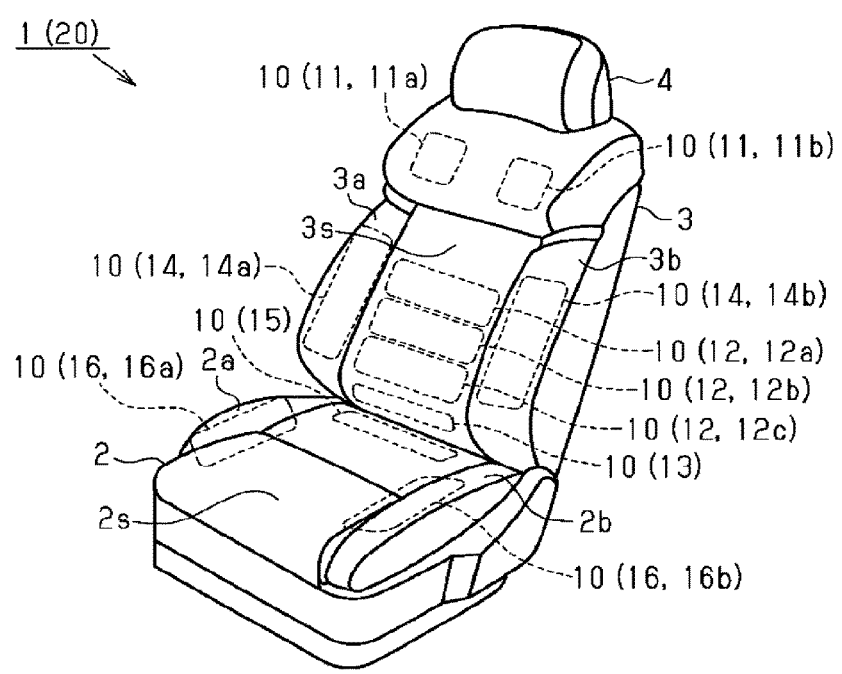
FIG. 1 is a perspective view illustrating a vehicle seat inside which air bags are provided.

As illustrated in FIG. 1, a seat 1 for a vehicle includes a seat cushion 2, and a seat back 3 provided at the rear end portion of the seat cushion 2. A headrest 4 is provided at the upper end of the seat back 3.

In the seat 1 according to the embodiment, the seat back 3 has a shape in which both side portions 3a and 3b bulge forward. Also, the seat cushion 2 has a shape in which both side portions 2a and 2b bulge upward. Accordingly, in the seat 1 according to the embodiment, it is possible to secure a good seating posture of the occupant and to maintain the seating posture.

In the seat 1, a plurality of air bags 10 (11 to 16) are provided inside the seat cushion 2 and the seat back 3. Specifically, in the seat 1 according to the embodiment, separate air bags 11 (11a and 11b), 12 (12a to 12c), 13, and 14 (14a and 14b) are provided at positions corresponding to a shoulder portion (shoulder), a waist portion (lumbar), and a lower end portion (back pelvis) of a backrest face 3s, and the both side portions 3a and 3b, respectively, inside the seat back 3. In the seat cushion 2 as well, separate air bags 15 and 16 (16a and 16b) are provided inside the rear end portion (cushion pelvis) on a seating surface 2s and inside the both side portions 2a and 2b, respectively. Accordingly, in the seat 1 according to the embodiment, a seat device 20 is formed in which a seat support shape may be changed based on expansion and contraction of each of the air bags 10.

Figure 2:
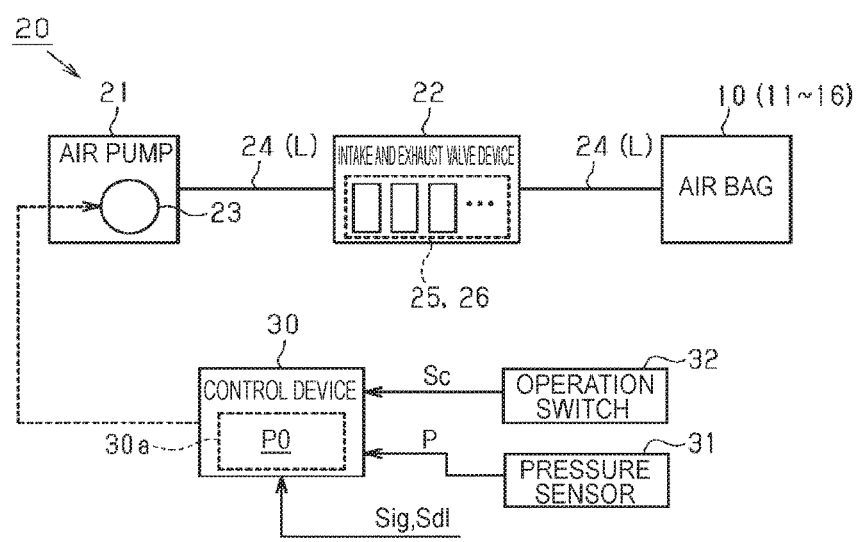
FIG. 2 is a schematic configuration diagram illustrating a seat device.

More specifically, as illustrated in FIG. 2, the seat device 20 according to the embodiment includes an air pump 21 that pumps air to each of the air bags 10, and an intake/exhaust valve device 22 interposed between each of the air bags 10 and the air pump 21. As the air pump 21 according to the embodiment, an electric pump using a motor 23 as a driving source is used. The intake/exhaust valve device 22 is connected to each of the air bags 10 and the air pump 21 via a flexible resin tube 24. That is, in the seat device 20 according to the embodiment, a flow path L is formed by the tube 24 and the internal passage of the intake/exhaust valve device 22 to communicate with each of the air bags 10 and the air pump 21. Accordingly, the intake/exhaust valve device 22 according to the embodiment includes a plurality of intake valves 25 and a plurality of exhaust valves 26 arranged in the middle of the flow path L.

In the seat device 20 according to the embodiment, operations of the intake valves 25, the exhaust valves 26, and the air pump 21 are controlled by a control device 30. Specifically, the control device 30 according to the embodiment detects an internal pressure P of each of the air bags 10, based on a signal output from a pressure sensor 31. An operation input signal Sc for an operation switch 32 provided in the seat 1, an ignition signal Sig, a door lock signal Sdl, or the like is input to the control device 30. Based on the control signals, the control device 30 according to the embodiment controls the operations of the intake valves 25, the exhaust valves 26, and the air pump 21 so as to expand and contract each of the air bags 10.

Figure 3:
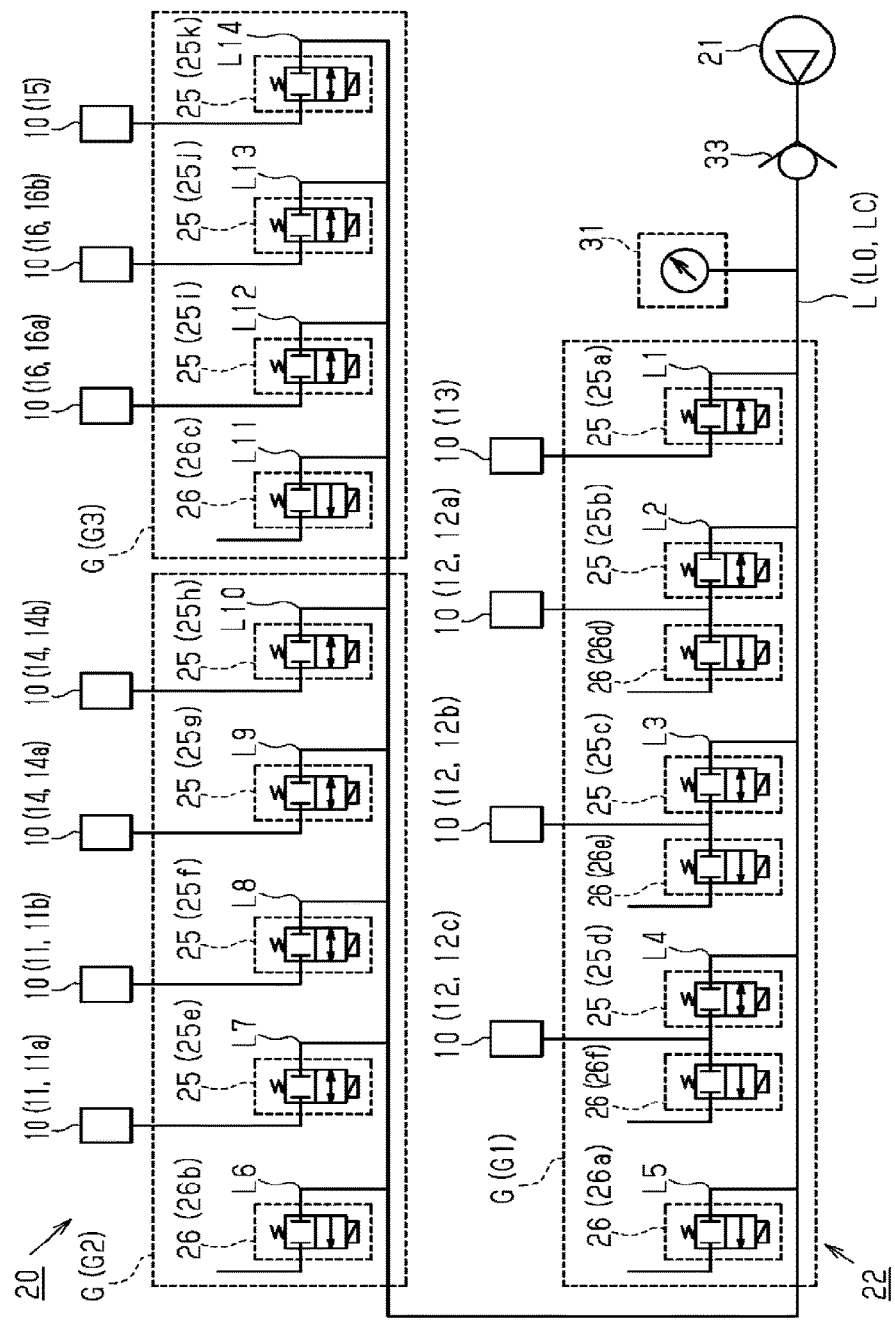
FIG. 3 is a schematic configuration diagram illustrating the seat device.

More specifically, as illustrated in FIG. 3, in the seat device 20 according to the embodiment, the flow path L includes a main line L0 extending from the air pump 21, and a plurality of branch lines L1 to L14 branching off from the main line L0. Specifically, the seat device 20 according to the embodiment includes a check valve 33 that prevents a backward flow of air pumped from the air pump 21, in the main line L0 of the flow path L. The flow path L in the embodiment has a configuration in which when the air pump 21 side is defined as the upstream, each of the branch lines L1 to L14 independently branches off from the main line L0 at the downstream side in relation to the check valve 33. Each of the air bags 10 for seat support is connected to each of the branch lines L1 to L14, one by one.

In the seat device 20 according to the embodiment, the air bag 13 for back pelvis support is connected to the branch line L1, and the air bags 12a to 12c for lumbar support are connected to the branch lines L2 to L4, respectively. The air bags 11a and 11b for shoulder support are connected to the branch lines L7 and L8, respectively, and the air bags 14a and 14b for backside support are connected to the branch lines L9 and L10, respectively. The air bags 16a and 16b for cushion side support are connected to the branch lines L12 and L13, respectively, and the air bag 15 for cushion pelvis is connected to the branch line L14.

In the seat device 20 according to the embodiment, the intake/exhaust valve device 22 has a configuration in which the intake valves 25 (25a to 25k) are arranged in the branch lines L1 to L4, L7 to L10, and L12 to L14 of the flow path L, respectively, to which the air bags 10 are connected. Specifically, each of the intake valves 25 (25a to 25k) is arranged at an upstream position of each of the air bags 10, when air is pumped into each of the air bags 10. The intake/exhaust valve device 22 according to the embodiment has a configuration in which the exhaust valves 26 (26a to 26c) are arranged in the branch lines L5, L6, and L11 of the flow path L, respectively, to which the air bags 10 are not connected.

In the intake/exhaust valve device 22 according to the embodiment, the intake valves 25 (25a to 25d) arranged in the branch lines L1 to L4 are partitioned into a first intake valve group G1, and the intake valves 25 (25e to 25h) arranged in the branch lines L7 to L10 are partitioned into a second intake valve group G2. The intake valves 25 (25i to 25k) arranged in the branch lines L12 to L14 are partitioned into a third intake valve group G3. The exhaust valves 26 (26a to 26c) are arranged in the branch lines L5, L6, and L11, respectively, so that the exhaust valves 26 (26a to 26c) are distributed in the first to third intake valve groups G1 to G3, respectively.

That is, when each air bag 10 is expanded, the control device 30 in the embodiment drives the air pump 21 in a state where the intake valve 25 (e.g., the intake valve 25a) located at the upstream of the target air bag 10 (e.g., the air bag 13) is opened, and all of the exhaust valves 26 (26a to 26c) provided in the branch lines L5, L6, and L11, respectively, are closed.

When each air bag 10 is contracted, the control device 30 opens the intake valve 25 (e.g., the intake valve 25a) corresponding to the target air bag 10 (e.g., the air bag 13), and selectively opens the exhaust valves 26 (26a to 26c) provided in the branch lines L5, L6, and L11, respectively, in a state where the air pump 21 is stopped. That is, while the intake valve 25 provided in the upstream and the exhaust valve 26 are opened, the internal air of each air bag 10 is discharged to the outside from the opened exhaust valve 26 via the main line L0 which is a shared section LC of the flow path L. Accordingly, the control device 30 according to the embodiment is configured to adjust the discharge speed when the internal air of each air bag 10 is discharged by selecting the exhaust valve 26 to be opened.

Figures 4, 5:
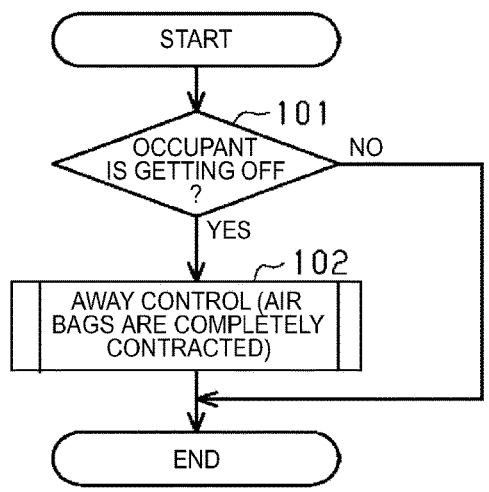
FIG. 4 is an explanatory view illustrating a relationship between an internal capacity of an air bag and a number of exhaust valves to be opened.
FIG. 5 is a flow chart of an away control.

Specifically, as illustrated in FIG. 4, in the seat device 20 according to the embodiment, the air bag 15 for cushion pelvis, the air bags 16 (16a and 16b) for cushion side support, and the air bag 13 for back pelvis support are classified into a first group A1 having a relatively small internal capacity (left-right total value). The air bags 11 (11a and 11b) for shoulder support and the air bags 14 (14a and 14b) for backside support are classified into a second group A2 having a relatively large internal capacity (left-right total value). The exhaust valves 26 (26a to 26c), which are arranged in the branch lines L5, L6, and L11, respectively, which communicate with the shared section LC of the flow path L as described above, have the same exhaust flow rate per unit time.

In view of this point, when the internal air of each of the air bags 10 (13, 15, and 16) belonging to the first group A1 having a relatively small internal capacity is discharged, the control device 30 according to the embodiment opens only the first exhaust valve 26a. When the internal air of each of the air bags 10 (11 and 14) belonging to the second group A2 having a relatively large internal capacity is discharged, the first and second exhaust valves 26a and 26b are opened. Accordingly, the seat device 20 according to the embodiment has a configuration in which a difference hardly occurs in an operation speed based on the internal capacity of each air bag 10 when a seat support shape is changed.

As illustrated in FIG. 3, in the seat device 20 according to the embodiment, in the branch lines L2 to L4, to which the air bags 12 (12a to 12c) for lumbar support are connected, respectively, the exhaust valves 26 (26d to 26f) dedicated to the air bags 12 are respectively provided at positions at the downstream side with respect to the intake valves 25 (25b to 25d). That is, the seat device 20 according to the embodiment has a configuration in which the air bags 12 (12a to 12c) for lumbar support are separately expanded and contracted using the exhaust valves 26 (26d to 26f), respectively. For example, the air bags 12 arranged in the vertical direction of the seat back 3 may be sequentially expanded and contracted so that the lumbar support shape formed in the waist portion of the backrest face 3s may be moved up and down.

As illustrated in the flow chart of FIG. 5, when detecting that the occupant is getting off the vehicle based on the ignition signal Sig, the door lock signal Sdl or the like (step 101: YES), the control device 30 executes an away contraction control of shifting the plurality of air bags 10 to a contracted state (step 102). Specifically, the control device 30 in the embodiment contracts all of the air bags 10 for seat support during the away control. Then, the control device 30 selects a full opening state in which all of the exhaust valves 26 (26a to 26c), which are provided in the branch lines L5, L6, and L11, respectively, are opened in order to discharge the internal air of the air bags 10 (11 and 13 to 16) other than the air bags 12 for lumbar support which have the above described dedicated exhaust valves 26 (26d to 26f).

Figure 6:
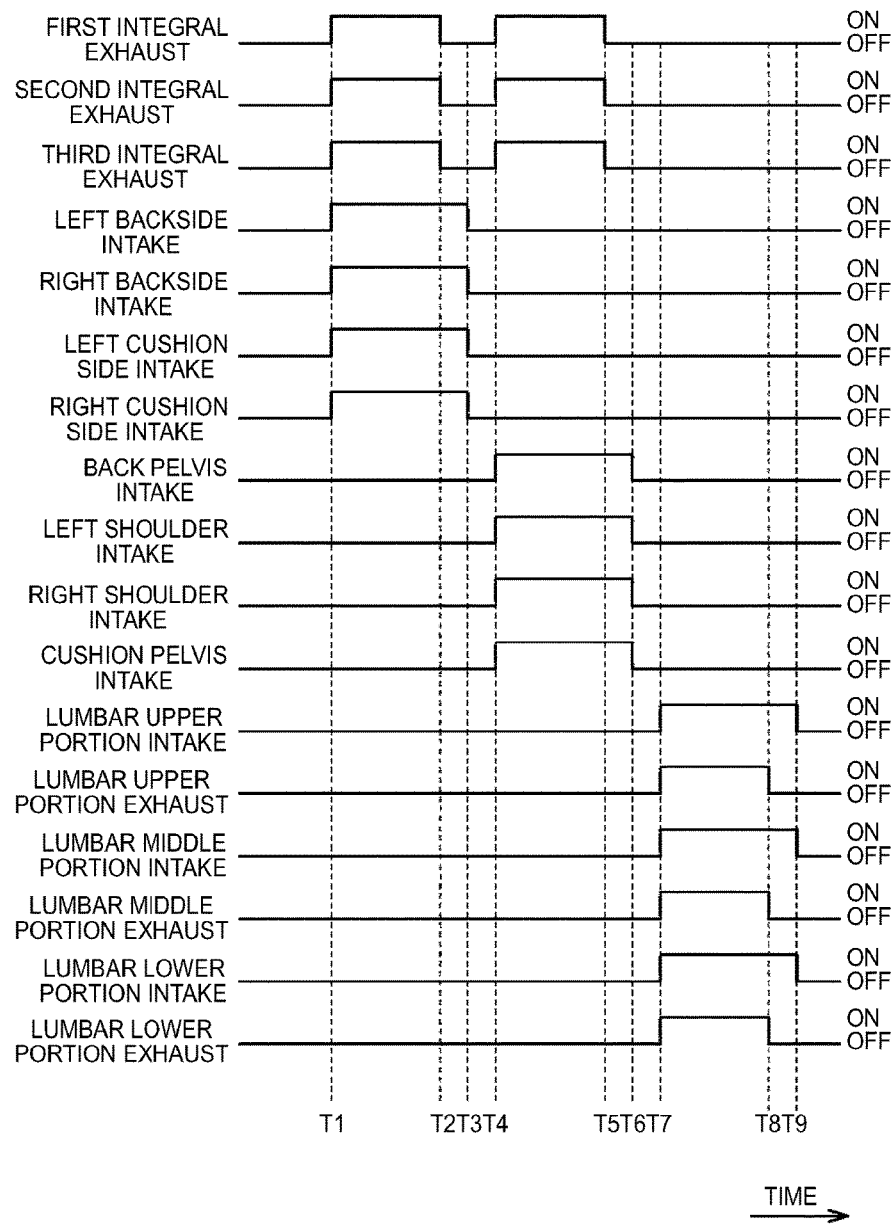
FIG. 6 is a time chart illustrating an aspect of the away control.

Specifically, as illustrated in the time chart of FIG. 6, first, the control device 30 opens the intake valves 25 (25g, 25h, 25i, and 25j), which are provided in the branch lines L9, L10, L12, and L13, respectively, which communicate with the air bags 14 (14a and 14b), and 16 (16a and 16b) for side support so as to contract the air bags 14 and 16 (time T1). The control device 30 opens all of the exhaust valves 26 (26a to 26c), which are provided in the branch lines L5, L6, and L11, respectively, while opening the intake valves 25 (25g, 25h, 25i, and 25j). After a lapse of a predetermined time, the exhaust valves 26 (26a to 26c) are closed (time T2), and then the intake valves 25 (25g, 25h, 25i, and 25j) corresponding to the air bags 14 and 16 are closed (time T3).

Next, the control device 30 opens the intake valves 25 (25a, 25e, 25f, and 25k), which are provided in the branch lines L1, L7, L8, and L14, respectively, which communicate with the air bags 11 (11a and 11b) for shoulder support and the air bags 13 and 15 for pelvis support so as to contract the air bags 11, 13, and 15 (time T4). The control device 30 opens all of the exhaust valves 26 (26a to 26c), which are provided in the branch lines L5, L6, and L11, respectively, while opening the intake valves 25 (25a, 25e, 25f, and 25k). After a lapse of a predetermined time, the exhaust valves 26 (26a to 26c) are closed (time T5), and then the intake valves 25 (25a, 25e, 25f, and 25k) corresponding to the air bags 11, 13, and 15 are closed (time T6).

After contracting the air bags 10 (11 and 13 to 16), the control device 30 in the embodiment contracts the air bags 12 (12a to 12c) for lumbar support. When the internal air of the air bags 12 is discharged, also in this away control, the exhaust valves 26 (26d to 26f), which are dedicated to the air bags 12, respectively, are used (time T7 to time T9).

In addition, as illustrated in FIG. 3, in the seat device 20 according to the embodiment, in the main line L0 of the flow path L, the pressure sensor 31 is provided at a position at the downstream side of the check valve 33 which is the shared section LC. That is, when one of the intake valves 25 is opened and each of the exhaust valves 26 is closed, the air pressure of the shared section LC in which the pressure sensor 31 is provided becomes substantially equal to the internal pressure P of the air bag 10 corresponding to the opened intake valve 25 (e.g., the air bag 11a for shoulder support which communicates with the branch line L7 when the intake valve 25e is opened). Accordingly, the control device 30 in the embodiment is configured to expand and contract each of the air bags 10 while monitoring the internal pressure P.

More specifically, the control device 30 in the embodiment maintains a target value (an internal pressure target value P0) of the internal pressure P of each air bag 10 in a storage area 30a (see FIG. 2). In the seat device 20 according to the embodiment, the internal pressure target value P0 of each air bag 10 is updated when the occupant sets an optimum support shape using the operation switch 32 (see FIG. 2) (support shape adjustment operation). The control device 30 in the embodiment is configured to control the operations of the intake valves 25 and the exhaust valves 26 of the intake/exhaust valve device 22 and the air pump 21 so that the internal pressure P of each air bag 10 to be detected coincides with the internal pressure target value P0.

More specifically, the control device 30 in the embodiment duty-controls the motor 23 of the air pump 21 by executing a PWM control when expanding each air bag 10. In the embodiment, the duty ratio (motor duty ratio) at the time of driving the air pump 21 is set for each of seat portions where each of the air bags 10 is arranged, that is, for each air bag 10. Accordingly, the seat device 20 according to the embodiment is configured to suppress a pressure loss occurring in the flow path L by making the flow rate of air pumped from the air pump 21 constant.

(Correction Control of Pressure Detection Value)

Hereinafter, descriptions will be made on a correction control of a pressure detection value executed by the control device 30 according to the embodiment.

The control device 30 according to the embodiment executes the correction control on an internal pressure P of each air bag 10, which is detected using the pressure sensor 31 as described above, in consideration of a pressure loss ΔP occurring in the flow path L. The control device 30 executes an expansion/contraction control of each air bag 10 based on a corrected pressure value P'.

More specifically, when air is pumped from the air pump 21 so as to expand each air bag 10, the control device 30 according to the embodiment corrects the internal pressure P of each air bag 10 detected by the pressure sensor 31, based on the following internal pressure correction equation in which an internal pressure correction value for the pressure loss is set as "Pc."

$$P'=P-Pc \qquad (1)$$

That is, assuming that the pressure loss from the air pump 21 to the pressure sensor 31 in the flow path L is "first intake pressure loss ΔPi1," a pressure detection value Ps obtained by the pressure sensor 31 becomes a value obtained by subtracting the first intake pressure loss $\Delta Pi1$ from an inlet pressure Pa in the flow path L as indicated in the following equation.

$$Ps = Pa - \Delta Pi1 \quad (2)$$

Assuming that the pressure loss from the pressure sensor 31 to each air bag 10 in the flow path L is "second intake pressure loss $\Delta Pi2$," an actual internal pressure Px of the air bag 10 to be detected becomes a value obtained by subtracting the second intake pressure loss $\Delta Pi2$ from the pressure detection value Ps obtained by the pressure sensor 31 as indicated in the following equation. The above equation (1) is based on the relationship indicated in the equation (3).

$$Px = Ps - \Delta Pi2 \quad (3)$$

The pressure loss $\Delta P$ occurring in the flow path L may be obtained by the following equation (4) (Darcy Weisbach equation) from each of parameters including a pipe friction coefficient $\lambda$, a pipe length Lx, a pipe inner diameter D, a gas density in the pipe (air density) $\gamma$, and a pipe flow velocity V. In the following equation and subsequent equations, "^2" and "^4" indicate "second power" and "fourth power," respectively.

$$\Delta P = \lambda \times (Lx/D) \times (\gamma \times (V^2)/2) \quad (4)$$

The equation (4) may be modified to the equation (7) from the relationship of the equation (6) by introducing a pressure loss coefficient K based on the structure of the flow path L as indicated in the following equation (5).

$$K = \lambda \times (Lx/D) \quad (5)$$

$$V = Q/(\pi \times (D^2)/4) \quad (6)$$

$$\Delta P = (8/(\pi^2)) \times \gamma \times ((K/D^4) \times (Q^2)) \quad (7)$$

Figure 7:
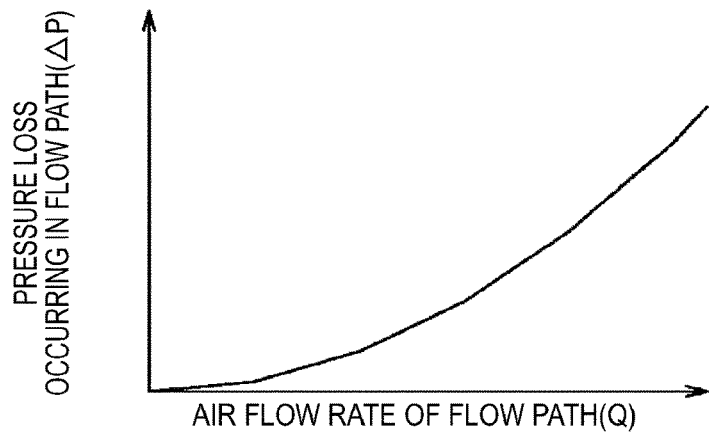
FIG. 7 is a graph illustrating a relationship between an air flow rate of a flow path and a pressure loss occurring in the flow path (when air is pumped)
Figure 8:
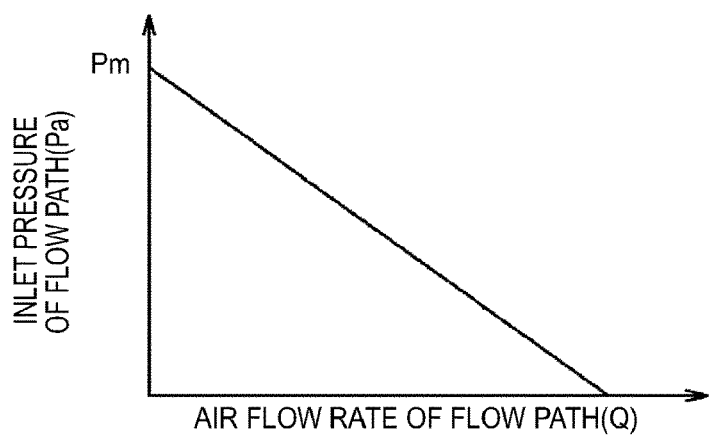
FIG. 8 is a graph illustrating a relationship between an air flow rate of a flow path and an inlet pressure of the flow path (when air is pumped)
Figure 9:
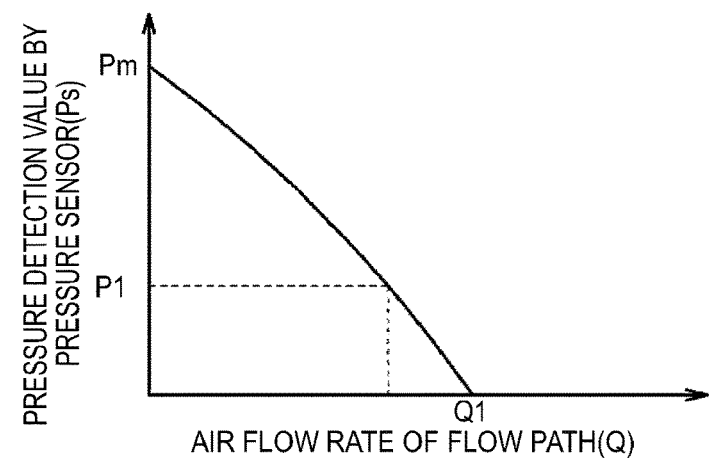
FIG. 9 is a graph illustrating a relationship between an air flow rate of a flow path and a pressure detection value by a pressure sensor (when air is pumped)

That is, as illustrated in FIG. 7, the pressure loss $\Delta P$ occurring in the flow path L increases in proportion to the second power of the air flow rate Q in the flow path L ($\Delta P \propto Q^2$). As illustrated in FIG. 8, the air flow rate Q in the flow path L, which is generated by driving the air pump 21, decreases in proportion to the pressure of air pumped by the air pump 21, that is, the inlet pressure Pa of the flow path L. Based on FIGS. 7 and 8, and the relationship indicated in the above equation (2), a pressure flow rate characteristic (PQ characteristic) is obtained at the location of the flow path L where the pressure sensor 31 is provided as illustrated in FIG. 9.

Based on the pressure flow rate characteristic, the air flow rate Q (the flow rate value Q1 in FIG. 9) in the flow path L may be obtained from the pressure detection value Ps (the pressure value P1 in FIG. 9) obtained by the pressure sensor 31. As illustrated in FIG. 10, based on the value of the air flow rate Q (the flow rate value Q1), the value of the second intake pressure loss $\Delta Pi2$ (the pressure value P2) from the pressure sensor 31 to each air bag 10 in the flow path L may be obtained.

That is, the pressure loss $\Delta P$ occurring in the flow path L during pumping of air by the air pump 21 is expressed by a relational expression of the pressure detection value Ps obtained by the pressure sensor 31 and a square root thereof ($\Delta P \propto Ps$, $\sqrt{Ps}$). Using the following equation (8) employing this relational expression, the control device 30 according to the embodiment calculates an internal pressure correction value Pc corresponding to the second intake pressure loss $\Delta Pi2$ from the pressure sensor 31 to each air bag 10.

$$Pc = \alpha 1 \times ((Ps - \alpha 2)^2) \times \alpha 3 \quad (8)$$

In the equation (8), "$\alpha 1$" "$\alpha 2$," and "$\alpha 3$" are correction coefficients.

That is, the correction coefficient $\alpha 2$ is a value corresponding to a maximum pressure Pm generated by the air pump 21 (see FIG. 9). The correction coefficient $\alpha 3$ is a value corresponding to a change of the air flow rate Q generated by driving the air pump 21.

More specifically, as illustrated in FIG. 11, the pressure loss $\Delta P$ occurring in the flow path L rapidly increases immediately after the driving of the air pump 21 is initiated, as the air flow rate Q steeply increases. Then, after the steep change of the air flow rate Q converges, the pressure loss $\Delta P$ gradually decreases as the air flow rate Q decreases.

Based on this point, as illustrated in FIG. 12, the value of the correction coefficient $\alpha 3$ in the above equation (8) is classified according to the elapsed time t from the occurrence of a pressure change accompanying the driving of the air pump 21. Specifically, when the elapsed time t is "0," the control device 30 according to the embodiment sets the value of the correction coefficient $\alpha 3$ to "0." Until the elapsed time reaches a preset initial time T1, the value of the correction coefficient $\alpha 3$ is set to "t/t1." Then, after the initial time T1 is exceeded, the value of the correction coefficient $\alpha 3$ is set to "1."

That is, when a pressure change accompanying the driving of the air pump 21 does not occur (t=0), the pressure loss $\Delta P$ of the flow path L also does not occur. Accordingly, in this case, the internal pressure correction value Pc is set to be "0." Then, immediately after the driving of the air pump 21 is initiated, the value of the correction coefficient $\alpha 3$ gradually changes until the steep change of the air flow rate Q converges (0<t≤1).

After a predetermined time has elapsed from the start of driving of the air pump 21, or after any one intake valve 25 is opened, when the pressure detection value Ps obtained by the pressure sensor 31 is stabilized and then increases by a predetermined value or more, the control device 30 according to the embodiment determines that the pressure change accompanying the driving of the air pump 21 has occurred.

In the case of detecting the internal pressure P of the air bag 10 when the internal air is discharged so as to contract each air bag 10, the control device 30 according to the embodiment corrects the internal pressure P of each air bag 10 detected by the pressure sensor 31, based on the following internal pressure correction equation in which an internal pressure correction value for a pressure loss is set as "Pd."

$$P' = P + Pd \quad (9)$$

That is, assuming that the pressure loss from each air bag 10 to the pressure sensor 31 in the flow path L is "first exhaust pressure loss $\Delta Pe1$" when the internal air is discharged using the exhaust valve 26, an actual internal pressure Px of the air bag 10 to be detected becomes a value obtained by adding the first exhaust pressure loss $\Delta Pe1$ to the pressure detection value Ps obtained by the pressure sensor 31 as indicated in the following equation (10). The above equation (9) is based on the relationship represented in the equation (10).

$$Px = Ps + \Delta Pe1 \quad (10)$$

Here, assuming that the pressure loss from the pressure sensor 31 to the exhaust valve 26 in the flow path L is "second exhaust pressure loss $\Delta Pe2$," an outlet pressure Pb of the flow path L becomes a value obtained by subtracting the second exhaust pressure loss $\Delta Pe2$ from the pressure detection value Ps obtained by the pressure sensor 31.

$$Pb = Ps - \Delta Pe2 \quad (11)$$

Figure 13:
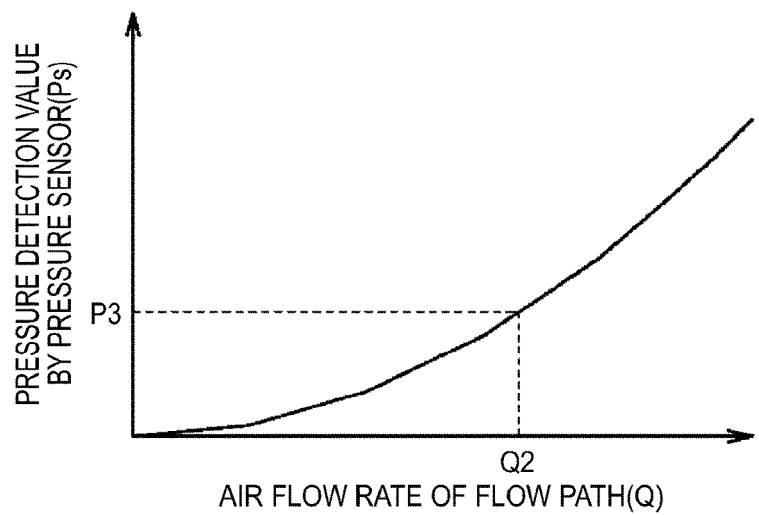
FIG. 13 is a graph illustrating a relationship between an air flow rate of a flow path and a pressure detection value by the pressure sensor (when internal air is discharged)
Figure 14:
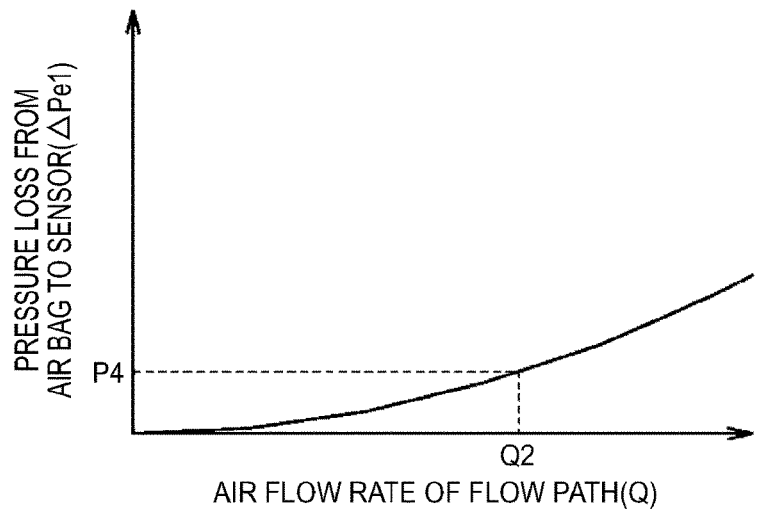
FIG. 14 is a graph illustrating a relationship between an air flow rate of a flow path and a pressure loss from the air bag to the pressure sensor (when internal air is discharged).

Accordingly, as illustrated in FIG. 13, from the above equation (7), the pressure detection value Ps obtained by the pressure sensor 31 increases in proportion to the second power of the flow rate Q of air discharged from the flow path L to the outside. Based on the pressure flow rate characteristic (PQ characteristic), the air flow rate Q (the flow rate value Q2 in FIG. 13) in the flow path L may be obtained from the pressure detection value Ps (the pressure value P3 in FIG. 13) obtained by the pressure sensor 31. As illustrated in FIG. 14, based on the value of the air flow rate Q (the flow rate value Q2), the value of the first exhaust pressure loss ΔPe1 from each air bag 10 to the pressure sensor 31 in the flow path L (the pressure value P4 in FIG. 14) may be obtained.

That is, the pressure loss ΔP occurring in the flow path L when the internal air is discharged using the exhaust valve 26 is expressed by a relational expression of the pressure detection value Ps obtained by the pressure sensor 31 (ΔP∝Ps). Using the following equation (12) employing this relational expression, the control device 30 according to the embodiment calculates an internal pressure correction value Pd corresponding to the first exhaust pressure loss ΔPe1 from each air bag 10 to the pressure sensor 31.

$$Pd = \beta 1 \times Ps \times \beta 2 \quad (12)$$

In the equation (12), "β1" and "β2" are correction coefficients. The correction coefficient β2 in the equation is a value corresponding to a change of the air flow rate Q accompanying the opening of the exhaust valve 26.

That is, the value of the correction coefficient β2 in the equation (12) is also classified according to the elapsed time t from the occurrence of a pressure change accompanying the opening of the exhaust valve 26 (see FIG. 12). In this case, after a predetermined time has elapsed from the opening of the exhaust valve 26, or after any one intake valve 25 is opened, when the pressure detection value Ps obtained by the pressure sensor 31 is stabilized and then decreases by a predetermined value or more, the control device 30 according to the embodiment determines that the pressure change accompanying the opening of the exhaust valve 26 has occurred.

As described above, according to the embodiment, the following effects may be achieved.

(1) The seat device 20 includes the plurality of air bags 10 provided inside the seat 1, and the flow path L having a shared section LC and communicating with the air bags 10. The seat device 20 includes the plurality of intake valves 25 each of which is arranged at a flow path position at the upstream side of each of the air bags 10 when air is pumped into each of the air bags 10, the plurality of exhaust valves 26 (26a to 26c) arranged at flow path positions communicating with the shared section LC of the flow path L, and the control device 30 that controls the operations of the intake valves 25 and the exhaust valves 26. The control device 30 adjusts the discharge speed of internal air when the internal air of each air bag 10 is discharged by selectively opening the exhaust valves 26.

According to the above configuration, it is possible to adjust the discharge speed of the internal air filled in each air bag 10 with a simple configuration without causing complication and enlargement of the exhaust valves 26. As a result, for example, a difference between seat portions hardly occurs in an operation speed when a seat support shape is changed. Accordingly, it is possible to improve the feeling of use of the occupant.

(2) When the internal air of each of the air bags 10 (13, 15, and 16) belonging to the first group A1 having a relatively small internal capacity is discharged, the control device 30 opens only the first exhaust valve 26a. When the internal air of each of the air bags 10 (11 and 14) belonging to the second group A2 having a relatively large internal capacity is discharged, the first and second exhaust valves 26a and 26b are opened.

That is, as described above, the number of exhaust valves 26 to be opened increases according to the internal capacity of each air bag 10 from which the internal air is discharged. Thus, a difference hardly occurs in an operation speed based on the internal capacity of each air bag 10 when a seat support shape is changed. Accordingly, it is possible to improve the feeling of use of the occupant.

(3) When detecting that the occupant is getting off the vehicle, the control device 30 executes an away control of shifting the plurality of air bags 10 to a contracted state. Then, in the away control, when the internal air of the air bags 10 (11 and 13 to 16) other than the air bags 12 for lumbar support is discharged, the control device 30 selects a full opening state in which all of the exhaust valves 26 (26a to 26c) provided in the branch lines L5, L6, and L11, respectively, that is, at flow path positions communicating with the shared section LC, are opened.

According to the above configuration, the away control may be quickly completed. Accordingly, it is possible to improve the feeling of use of the occupant.

(4) In the intake/exhaust valve device 22, the intake valves 25 are partitioned into a plurality of intake valve groups G (G1 to G3). The exhaust valves 26 (26a to 26c) arranged at flow path positions communicating with the shared section of the flow path L are provided to be distributed in the intake valve groups G, respectively.

According to the above configuration, the intake and exhaust function of each intake valve group G may be completed. As a result, by selecting which of intake valve groups G to use, or selecting which of combinations of the intake valve groups G to use, the configuration may be employed in various seats which are different in seat portions where the air bags 10 are arranged. Accordingly, it is possible to secure excellent versatility.

For example, for seats provided with the air bags 12a to 12c, and 13 for lumbar support and back pelvis support, the intake valves 25a to 25d and the exhaust valves 26a, and 26d to 26f partitioned into the first intake valve group G1 may be used. In addition to this, for seats provided with the air bags 11a, 11b, 14a, and 14b for shoulder support and backside support, the intake valves 25e to 25h and the exhaust valve 26b partitioned into the second intake valve group G2 may be additionally used. For seats provided with the air bags 15, 16a, and 16b for cushion pelvis and cushion side support, the intake valves 25i to 25k and the exhaust valve 26c partitioned into the third intake valve group G3 may be additionally used.

The embodiment may be modified as follows.

In the above embodiment, the exhaust valves 26 (26a to 26c) arranged at the flow path positions communicating with the shared section of the flow path L have the same exhaust flow rate per unit time. However, the disclosure is not limited thereto. A plurality of exhaust valves 26 having different exhaust flow rates may be provided at the flow path positions communicating with the shared section of the flow path L. For example, when the internal air is discharged, the exhaust valve 26 having a larger discharge flow rate may be selected according to the size of the internal capacity of the air bag 10. When the plurality of exhaust valves 26 are opened simultaneously, the discharge speed of the internal air may be more accurately adjusted by the combination.

In the above embodiment, in the intake/exhaust valve device 22, the intake valves 25 are partitioned into the plurality of intake valve groups G (G1 to G3), and each of the exhaust valves 26 (26a to 26c) arranged at the flow path positions communicating with the shared section LC is provided for each of the intake valve groups G. However, the disclosure is not limited thereto. The total number of the intake valves 25 and the number of the intake valve groups G may be arbitrarily changed. The number of the intake valves 25 and the number of the exhaust valves 26 belonging to each intake valve group G may also be arbitrarily changed. Meanwhile, in consideration of versatility, at least one exhaust valve 26 may be provided for each intake valve group G. It is possible to arbitrarily set which one of the intake valve groups G to use, or which air bag 10 arranged in which seat portion is to be connected.

In the above embodiment, the number of the exhaust valves 26 to be opened increases according to the internal capacity of the air bag 10 from which the internal air is discharged. However, the disclosure is not limited thereto. The exhaust valve 26 to be opened may be selected according to the seat portion in which the air bag 10 from which the internal air is to be discharged is arranged. Accordingly, it is possible to optimize the operation speed for each seat portion in which the air bag is arranged.

The number of the exhaust valves 26 to be opened may increase according to the discharge amount of the internal air. Accordingly, it is possible to more quickly complete the discharge of the internal air.

In the above embodiment, in the away control in which all of the air bags 10 for seat support are contracted, first, the air bags 14 (14a and 14b) and 16 (16a and 16b) for side support are contracted, and then the air bags 11 (11a and 11b) for shoulder support and the air bags 13 and 15 for pelvis support are contracted. Then, in these two processes, a full opening state is selected in which all of the exhaust valves 26 (26a to 26c) provided at the flow path positions communicating with the shared section LC are opened. However, the disclosure is not limited thereto. In the away control, it is possible to arbitrarily set any of processes for which the full opening state is to be selected. That is, the away control only has to include selection of the full opening state in which all of the exhaust valves 26 communicating with the shared section are opened at any timing. The away control does not necessarily have to contract all of the air bags 10. Regarding the manner of the away control, the air bags 10 may be contracted at once, the air bags 10 may be successively and sequentially contracted, or a combination thereof may be employed.

In the above embodiment, the exhaust valves 26 (26a to 26c) are arranged in the branch lines L5, L6, and L11 of the flow path L, respectively, to which the air bags 10 are not connected, and the exhaust valves 26 are arranged at the flow path positions communicating with the shared section LC of the flow path L. However, the disclosure is not limited thereto. As long as the flow path position communicates with the shared section LC, the flow path position at which each exhaust valve 26 is arranged, including the main line L0 which becomes the shared section LC, may be arbitrarily changed.

It is preferable that a vehicle seat device according to an aspect of the disclosure includes: a plurality of air bags configured to be provided inside a seat; a flow path having a shared section and communicating with each of the air bags; a plurality of intake valves each of which is arranged at a flow path position at an upstream of each of the air bags when air is pumped into each of the air bags; a plurality of exhaust valves arranged at flow path positions communicating with the shared section; and a control device configured to control operations of the intake valves and the exhaust valves, in which the control device adjusts a discharge speed of internal air by selectively opening the exhaust valves when the internal air of each of the air bags is discharged.

According to this configuration, it is possible to adjust the discharge speed of the internal air filled in each air bag with a simple configuration without causing complication and enlargement of the exhaust valves. As a result, for example, a difference between seat portions hardly occurs in an operation speed when a seat support shape is changed. Accordingly, it is possible to improve the feeling of use of the occupant.

In the vehicle seat device, it is preferable that the control device increases a number of the exhaust valves to be opened according to an internal capacity of each of the air bags from which the internal air is discharged.

According to this configuration, a difference hardly occurs in an operation speed based on the internal capacity of each air bag when the internal air of the air bag is discharged. Accordingly, it is possible to improve the feeling of use of the occupant.

In the vehicle seat device, it is preferable that the control device increases a number of the exhaust valves to be opened according to a discharge amount of the internal air. According to this configuration, it is possible to more quickly complete the discharge of the internal air.

In the vehicle seat device, it is preferable that the plurality of exhaust valves have different exhaust flow rates.

According to this configuration, by selecting the exhaust valve to be opened, the discharge speed of the internal air may be precisely adjusted. When the plurality of exhaust valves are opened simultaneously, the discharge speed of the internal air may be more accurately adjusted by the combination.

In the vehicle seat device, it is preferable that the control device selects the exhaust valves to be opened according to a seat portion in which each of the air bags from which the internal air is discharged is arranged.

According to this configuration, it is possible to optimize the operation speed for each seat portion in which the air bag is arranged.

In the vehicle seat device, it is preferable that the control device executes an away control of shifting the plurality of air bags to a contracted state, and the away control includes selecting a full opening state in which all of the exhaust valves communicating with the shared section are opened.

According to this configuration, the away control may be quickly completed. Accordingly, it is possible to improve the feeling of use of the occupant.

It is preferable that an intake and exhaust valve device according to another aspect of the disclosure includes: a plurality of intake valves each of which is arranged at a flow path position at an upstream of each of air bags when air is pumped into each of the air bags in a flow path having a shared section and communicating with each of the air bags; and a plurality of exhaust valves arranged at flow path positions communicating with the shared section.

According to this configuration, it is possible to adjust the discharge speed when the internal air of each air bag is discharged by selectively opening the exhaust valves. Accordingly, it is possible to reduce a size of a device by avoiding complication and enlargement of the exhaust valves.

In the intake and exhaust valve device, it is preferable that the intake valves are partitioned into a plurality of intake valve groups, and at least one of the exhaust valves is provided in each of the intake valve groups.

According to this configuration, the intake and exhaust function of each intake valve group may be completed. As a result, by selecting which of intake valve groups to use, or selecting which of combinations of the intake valve groups to use, the configuration may be employed in various seats which are different in seat portions where the air bags are arranged. Accordingly, it is possible to secure excellent versatility.

According to the aspects of this disclosure, the discharge speed of the internal air filled in the air bag may be adjusted with a simple configuration.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat device comprising:
   a plurality of air bags configured to be provided inside a seat;
   a flow path having a shared section to communicate with each of the air bags;
   a plurality of intake valves each of which is arranged at a flow path position at an upstream of each of the air bags;
   a plurality of exhaust valves arranged at flow path positions communicating with the shared section; and
   a control device configured to control operations of the intake valves and the exhaust valves,
   wherein the intake valves are partitioned into a plurality of intake valve groups and at least one of the exhaust valves is provided in each of the intake valve groups, and
   wherein the control device adjusts a discharge speed of internal air by selecting a number of the exhaust valves to be opened according to an internal capacity of each of the air bags from which the internal air is discharged when the internal air of each of the air bags is discharged.

2. The vehicle seat device according to claim 1, wherein the control device increases a number of the exhaust valves to be opened according to an internal capacity of each of the air bags from which the internal air is discharged.

3. The vehicle seat device according to claim 1, wherein the control device increases a number of the exhaust valves to be opened according to a discharge amount of the internal air.

4. The vehicle seat device according to claim 1, wherein the plurality of exhaust valves have different exhaust flow rates.

5. The vehicle seat device according to claim 1, wherein the control device executes an away control of shifting the plurality of air bags to a contracted state, and the away control includes selecting a full opening state in which all of the exhaust valves communicating with the shared section are opened.

* * * * *